United States Patent [19]
Carpigiani

[11] 3,742,724
[45] July 3, 1973

[54] ICE CREAM MACHINE
[75] Inventor: Poerio Carpigiani, Bologna, Italy
[73] Assignee: APAW S.A., Fribourg, Switzerland
[22] Filed: Mar. 27, 1972
[21] Appl. No.: 238,300

[30] Foreign Application Priority Data
Apr. 1, 1971 Italy .............................. 12608 A/71

[52] U.S. Cl. ........................ 62/331, 62/342, 259/46
[51] Int. Cl. ............................................. F25c 7/10
[58] Field of Search ...................... 62/342, 343, 331; 259/36, 47, 46

[56] References Cited
UNITED STATES PATENTS
3,182,967  5/1965  Krahe ............................. 259/47 X Primary Examiner—William E. Wayner
Attorney—Roberts B. Larson et al.

[57] ABSTRACT

A machine for the batchwise production of ice-cream, comprising a freezing cylinder communicating at one end with a liquid mix feed port and at the opposite end with an ice cream delivery port. Inside of the said freezing cylinder a rotatable beater is mounted, which is entrained in rotation by a disc-like plate. Means are provided for shifting the said disc-like plate axially along the freezing cylinder at the end of the ice-cream mixing and freezing operation, in order to force the produced ice-cream batch from the freezing cylinder out of the delivery port.

6 Claims, 4 Drawing Figures

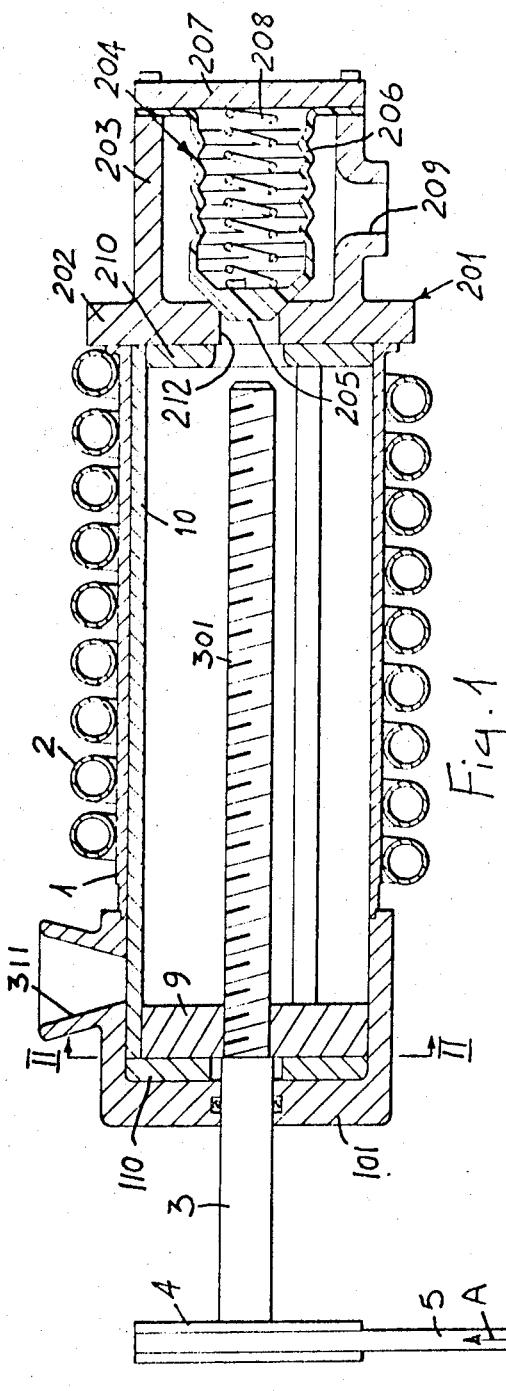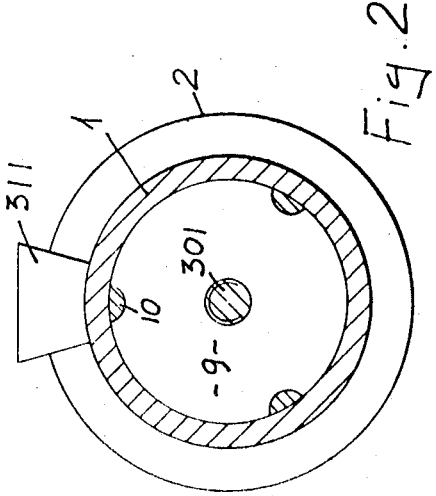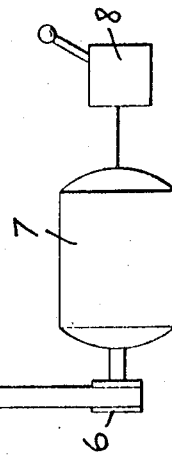

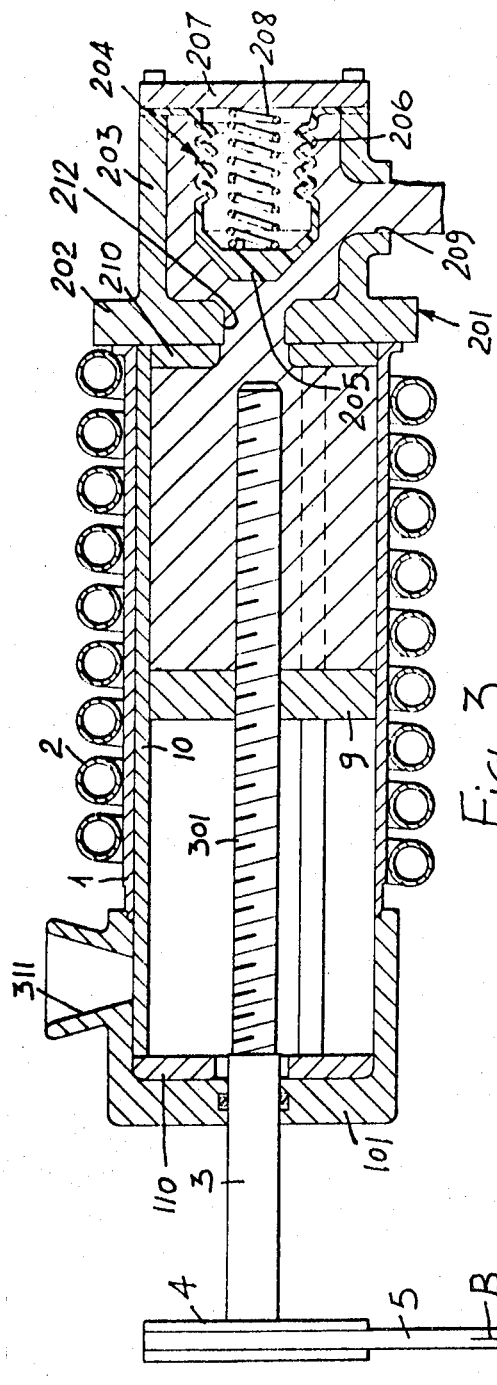
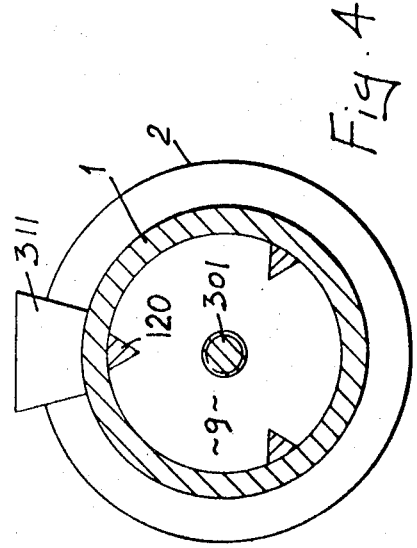
Fig. 3
Fig. 4

ICE CREAM MACHINE

BACKGROUND OF THE INVENTION

The invention relates to a machine for the batchwise production of ice-cream, of the kind comprising a freezing cylinder, communicating at one end with a liquid mix feed port and at the opposite end with an ice-cream delivery port, and provided at its inside with a motor operated whipping mechanism.

In the machines of this kind, there is the problem of the quick and complete extraction of the batch of ice-cream produced. Normally, the said machines are equiped with helical beaters, which are also used for discharging the batch of ice-cream from the machine. To use the helical beater to this purpose is however objectionable, both from the standpoint of the rapidity of the discharging operation, and from the standpoint of the completeness of the said discharge. It is in fact known that in a machine of this type, different flavoured ice creams are normally subsequently worked, so that it is necessary to have the machine emptied as completely as possible from the previously treated ice-cream, before to start the working of the subsequent batch of a different flavoured ice-cream.

It is also known to use, in machines of this kind, beaters formed by a plate, normally a perforated plate, which is reciprocated through the freezing chamber, and which may be also used for the extraction of the batch of ice-cream produced.

In the machines of this kind, the problem of the quick extraction of the produced batch of ice-cream is solved in a satisfactory manner, but the said reciprocating beater requests a complex operation device and does not produce an ice-cream of a satisfactory texture as it is done by the revolving scraping type beaters.

It is therefore the scope of the invention to provide a machine for the batchwise production of ice-cream provided with a revolving scraping beater, and further provided with piston like means for the quick and complete extraction of the produced batch of ice cream.

According to the invention this is accomplished by providing in the inside of the freezing cylinder a plate like element of a outer diameter equal to the inner diameter of the said cylinder, which plate like element may be reciprocated axially from one end to another of the said cylinder by means of a threaded motor-operated spindle passing through a correspondingly threaded bore formed centrally in the said plate, the said plate being further provided peripherally with slits or borings into which a corresponding number of scraping and whipping blades are slidingly engaged, the said blades extending axially along the said freezing cylinder for the whole length thereof, and are secured at their ends to corresponding end plates, so as to be rotatably but not axially shiftably supported inside of said cylinder, the whole being arranged so that by rotating the said threaded shaft in one direction, the said first-named plate element is shifted to the end of the freezing cylinder opposed to the ice cream delivery port, and thereafter it entrains into rotation the said scraping blades, and by rotating the said threaded shaft in the opposite direction, the said plate is axially shifted through said freezing cylinder so as to expel the whole ice-cream batch through the ice-cream delivery port outside of said freezing cylinder.

BRIEF DESCRIPTION OF THE DRAWINGS

FIG. 1 is a longitudinal sectional view of a machine according to the invention, with the ice-cream extraction plate in starting position, in which it entrains into rotation the beater assembly.

FIG. 2 is a transversal sectional view taken along line II—II of FIG. 1.

FIG. 3 is a view corresponding to FIG. 1, with the ice-cream extraction plate being shifted toward the delivery end of the freezing cylinder, during the ice cream extraction step, and FIG. 4 is a cross section corresponding to FIG. 2, of a second embodiment of the invention.

DESCRIPTION OF THE PREFERRED EMBODIMENT OF THE INVENTION

With reference to FIGS. 1 to 3 of the drawings, the machine shown comprises a freezing cylinder 1, which is closed at its rear end by a first closure member 101, and which is closed at its forward end by a second closure member 201.

The outer mantle of the cylinder 1 is encircled by a refrigerating coil 2, forming part of the evaporator of a conventional freezing equipment (not shown). The closure member 101 is centrally provided with a through bore, through which the shaft 3 is rotatably guided. On the end of shaft 3 projecting outside of cylinder 1 a pulley 4 is keyed, which is operated through a belt 5 and pulley 6 transmission from the operating motor 7. The motor 7 is controlled by a phase inverting switch 8, of conventional construction.

The end 301 of the shaft 3 projecting inside of the freezing cylinder 1 extends coaxially to said cylinder substantially the whole length thereof. The said inside portion 301 of shaft 3 is threaded, and on the said threaded shaft portion an expulsion plate 9 is threadedly engaged, through a threaded bore formed centrally on said plate 9. The outer diameter of the plate 9 is substantially equal to the inner diameter of the cylinder 1, and the said plate is further provided peripherally with a number (three, in the example shown) of equally spaced apart notches having a suitable profile, mating the profile of the bars 10. The bars 10, forming the beater elements for the ice cream mix to be threaded in the cylinder 1, extends from one end to the other of the chamber 1, substantially parallel to the directix of the cylindrical mantle of the freezing chamber 1, and are connected at their ends by a pair of base plates 110, 210, so as to form a cage structure rotatable inside of the chamber 1 around an axis coaxial to the longitudinal axis of the said chamber. The said plates 110 and 210 are bored axially. The closure member 201 closing the front end of the freezing cylinder 1 comprises a first plate 202, provided with an axial bore 212 facing the boring of the plate 210. To the said plate 202 a box like element 203 is secured, housing a closure member 204 cooperating with the bore 212 in the plate 202. The said closure member comprises a valve body 205 made of rubber or the like material, provided with a bellow like skirt extension secured between the cover 207 and the front end of the box like element 203, and housing in its interior a spring 208, urging the valve body 205 against the bore 212 formed in the plate 202. The box like element 203 is further laterally provided with an ice cream extrusion port 209, downstream of the valve member 205, for the delivery of the produced ice cream. A hopper like element 311 is further provided, communicating with the interior of the freezing cylinder 1, through which the liquid ice-cream mix may be poured into the freezing cylinder.

MODE OF OPERATION OF THE DESCRIBED EMBODIMENT

Supposing the machine to be in the operative position shown in FIG. 1 of the drawings, that is with the plate 9 adhering against the plate 110 of the beater assembly (starting position). Through the hopper 311 the liquid ice-cream mix is introduced into the freezing cylinder 1, and thereafter the motor 7 and the motorcompressor of the freezing plant are started care being taken to insert the phase inverter 8 of motor 7 in a position in which the motor 7, and thereafter the shaft 3 are rotated, in a direction in which the plate 9 is urged against the plate 110 (direction of arrow A of FIG. 1).

In this rotation direction of the shaft 3, the plate 9 entrains into rotation the whipping assembly, formed by the bars 10, which are into engagement with the plate 9, and by the plates 110 and 210. Once the ice-cream is at the desired consistency, which may be determined by means of a thermostatic control or by other suitable control means, the ice-cream batch may be extracted from the freezing cylinder. To this end, the direction of rotation of the motor 7 is inverted, by acting on the phase inverter 8. The consequent rotation of the shaft in a direction opposite to the previous rotation direction (direction of arrow B of FIG. 3) causes the axial shifting of the plate 9 along the threaded spindle portion 301, from the rear to the front end of the freezing cylinder 1. During this operation, the bars 10 are acting as guides for the movement of the plate 9.

The ice-cream formed in the chamber 1 is by consequence extruded through the port 212, against the action of the spring 208 acting on the valve body 205, which is thus forced into a position in which it clears up the port 212, so that the ice cream may pass into the chamber 203 and from this chamber through the port 209 to the outside, as shown in FIG. 3.

Once completed the extrusion of the whole ice-cream batch from the freezing cylinder 1, the plate 9 is returned to its starting position of FIG. 1, by acting again on the phase inverter 8, and the machine ready for the treatment of a novel batch of ice-cream.

In FIG. 4 a second embodiment of the invention is shown, according to which the whipping bars 120 are of triangular cross section.

I claim

1. A machine for the batchwise production of ice-cream, comprising a freezing cylinder closed at both ends, and provided with a liquid mix inlet port, an ice-cream delivery port, means for refrigerating the said freezing cylinder, and whipping means inside of said freezing cylinder, the said whipping means being formed by a number of whipping bars extending parallel to the inner cylindrical mantle of said freezing cylinder from one end to the opposite end thereof, means for connecting together the ends of said whipping bars so as to support them rotatably but not axially shiftably inside of said freezing cylinder, a plate like member in said freezing cylinder, the said plate like member being into engagement with the said whipping bars so as to rotate therewith, and being further capable of being shifted axially from one end to the opposite end of said freezing chamber, said plate like member being provided centrally with a threaded through bore, a threaded shaft extending axially through said freezing cylinder, said threaded shaft being into engagement with the threaded bore in said plate like member, power operating means outside of said freezing chamber for rotating said threaded shaft, and control means associated with said threaded shaft operating means for controlling the rotation of said shaft in opposite directions.

2. A machine according to claim 1, in which the said whipping bars are connected together at their ends by a pair of annular members.

3. A machine according to claim 1 in which the said ice cream delivery port is formed on one end of the said freezing cylinder, means being provided for closing the said delivery port.

4. A machine according to claim 3, in which the said delivery port closure means are formed by a valve body which is urged by a spring against the said delivery port.

5. A machine according to claim 1, in which the said whipping bars are in scraping contact with the cylindrical walls of the freezing chamber.

6. A machine according to claim 1, in which the said plate like member has an outer diameter equal to the inner diameter of the said freezing cylinder.

* * * * *